(12) United States Patent
Roberts et al.

(10) Patent No.: US 12,452,756 B2
(45) Date of Patent: Oct. 21, 2025

(54) PHYSICAL LAYER RATE ESTIMATES IN WIRELESS COMMUNICATION SYSTEMS

(71) Applicant: Calix, Inc., San Jose, CA (US)

(72) Inventors: Harold A. Roberts, Excelsior, MN (US); Daniel J. Sills, Moss Beach, CA (US); Eric I. Leal, Richardson, TX (US)

(73) Assignee: Calix, Inc., San Jose, CA (US)

( * ) Notice: Subject to any disclaimer, the term of this patent is extended or adjusted under 35 U.S.C. 154(b) by 593 days.

(21) Appl. No.: 17/933,746

(22) Filed: Sep. 20, 2022

(65) Prior Publication Data

US 2024/0098600 A1   Mar. 21, 2024

(51) Int. Cl.
*H04W 36/08* (2009.01)
*H04W 36/26* (2009.01)

(52) U.S. Cl.
CPC .......... *H04W 36/26* (2013.01); *H04W 36/08* (2013.01)

(58) Field of Classification Search
CPC ......... H04W 36/0058; H04W 36/0085; H04W 36/0088; H04W 36/0094; H04W 36/08; H04W 36/16; H04W 36/24; H04W 36/26; H04W 36/30; H04W 36/302; H04W 36/304

See application file for complete search history.

(56) References Cited

U.S. PATENT DOCUMENTS

| | | | |
|---|---|---|---|
| 2015/0350850 A1* | 12/2015 | Edge | H04W 88/02 455/456.1 |
| 2022/0174527 A1* | 6/2022 | Nagendran | H04W 24/10 |
| 2023/0397098 A1* | 12/2023 | Nix | H04W 24/10 |

* cited by examiner

*Primary Examiner* — Matthew W Genack
(74) *Attorney, Agent, or Firm* — Shumaker & Sieffert, P.A.

(57) ABSTRACT

A wireless system includes memory configured to store information of physical layer rates associated with power levels between a client device and respective access points. The power levels comprise information of amounts of power in signals received by the client device from the respective access points. The system includes one or more processors configured to: during a communication session between the client device and a first access point, determine a current power level between the client device and a second access point, access the information based on the current power level to determine an expected physical layer rate between the client device and the second access point, determine a current physical layer rate between the client device and the first access point, and determine whether to switch the communication session to the second access point based on the expected physical layer rate and the current physical layer rate.

21 Claims, 5 Drawing Sheets

PHYSICAL LAYER RATE ESTIMATES IN WIRELESS COMMUNICATION SYSTEMS

TECHNICAL FIELD

This disclosure relates to communication systems, and more particularly, communication between client devices and access points in a wireless communication system.

BACKGROUND

A wireless communication system, such as a wireless network configured for operation in accordance with the Wi-Fi protocols, includes access points and client devices. Signal strength is one factor used to determine with which access point a client device should communicate.

DETAILED DESCRIPTION

Figure 1A:
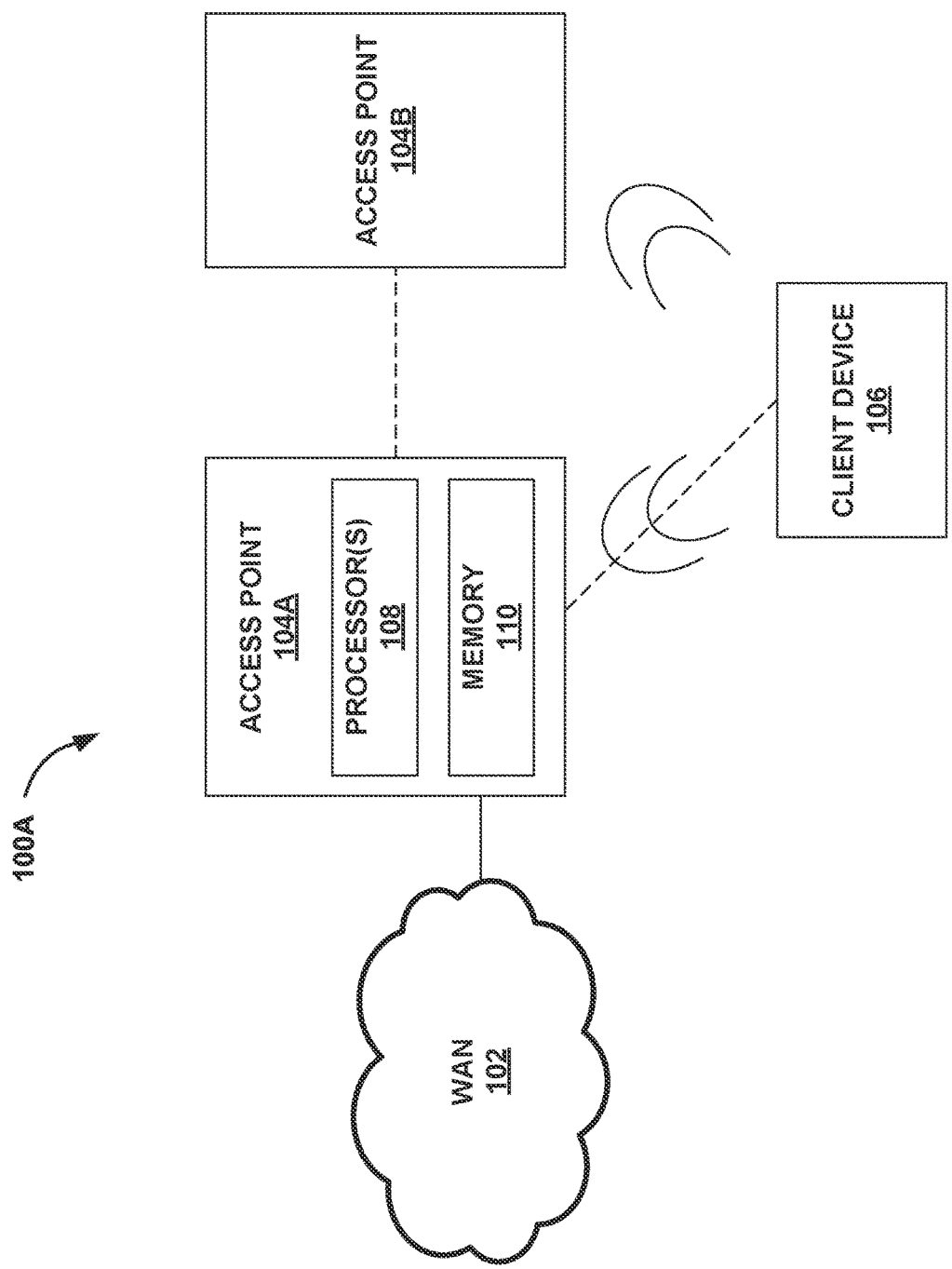
FIGS. 1A-1C are block diagrams illustrating example wireless communication systems, in accordance with one or more aspects of this disclosure.

A wireless communication system (e.g., wireless network) includes one or more access points and one or more client devices. For communication, each client device may be associated with one of the access points. For instance, in one example wireless network topology, a first access point may be a gateway router that couples to a wide area network (WAN) such as the Internet. The first access point may communicate with a plurality of other access points (e.g., within a premises), and the plurality of other access points may wirelessly communicate with one or more client devices (e.g., computers, smartphones, tablets, smart watches, Internet of Things (IoT) devices, etc.). The plurality of other access points may be routers, extenders, repeaters, and the like. The first access point may also wirelessly communicate with one or more client devices. The plurality of other access points may also communicate to yet other access points.

One access point may establish respective communication sessions with one or more client devices. Communication session, as used in this disclosure, refers to the downloading of data that a user requests, such as from the Internet. Communication session should not be confused with a temporary connection used for determining whether to steer the client device to different access points.

The access point/client device pairing for a communication session may be established based on optimizing a physical layer rate. For instance, in a Wi-Fi network there may be multiple access points (APs) in a mesh network, and the user experience may be improved when the client devices are connected to (e.g., associated with) access points that increase the end-to-end bandwidth (i.e., physical layer rate or "PHY" rate) of the client device's connection to the Internet.

Measuring the actual physical layer rate for each client device and access point pair to determine the client device access point association may be time intensive. An example proxy for measuring physical layer rate may be power level measurements (i.e., signal strength measurements). For instance, if the power level of a signal that a client device receives from a first access point is greater than the power level of a signal that the client device receives from a second access point, then there is a higher likelihood that the physical layer rate between the client device and the first access point is greater than the physical layer rate between the client device and the second access point.

Measuring the signal strength (i.e., power level) of different access points from the point of view of the client devices is one of the metrics that may be used to determine which access point any given client device should be associated with for improved performance. The Wi-Fi standard 802.11k provides such a measurement that can be obtained from a client device using the 802.11k report. That is, in response to a request for an 802.11k report, the client device may generate the 802.11k report. Among other parameters, the 802.11k report includes information of the power level as measured at the client of respective signals from respective access points. From the 802.11k report, it may be possible to determine from which access point the client device received a signal having the highest signal strength, and then associate that access point with the client device for a communication session. A communication session may refer to a session in which a user of the client device can download or upload content from the Internet. A communication session may not be a temporary connection used for testing, etc., but may be a longer, persistent way for the client device to receive and transmit data.

It may be useful to periodically determine whether a client device in a communication session with a current access point should switch the communication session to another access point because the physical layer rate with the other access point may be better. In one or more examples, during the communication session with the current access point, the client device may generate an 802.11k report. One or more processors (e.g., controller(s)) of the wireless communication system) may determine whether to switch the communication session based on the 802.11k report.

However, there may be issues relying on the 802.11k report. Many of the client devices in the marketplace incorrectly encode the 802.11k reports, making these reports less reliable in determining the best access point in a multi-access point network for such client devices. This disclosure describes example techniques of correcting and utilizing the 802.11k reports for the purpose of Wi-Fi network client steering to optimize the performance of the network. That is, although the 802.11k report from a client device may be erroneous, the 802.11k report from the client device tends to be erroneous in the same way. For instance, the values in the 802.11k report may not represent the actual amount of power received by the client device, but the values in the 802.11k report are not random values. Rather, for two signals transmitted by an access point having the same signal strength received by the client device at two different times, the client device would report the same power level, even though the reported power level is incorrect.

In one or more examples, to calibrate for the inaccurate power level reporting, the one or more processors may be configured to associate actual physical layer rates with the reported power levels. For instance, while a client device is in a communication session with a first access point, the one or more processors may request the client device to generate an 802.11k report. The 802.11k report may include information of the power level between the first access point and the client device, as well as power levels between other access points and the client device.

The one or more processors may also determine the physical layer rate between the first access point and the client device. For instance, as part of Wi-Fi network compliance, the first access point may be configured to generate information of the physical layer rate between the first access point (i.e., itself) and all client devices with which the first access point is in communication. The one or more processors may associate the physical layer rate, as reported by the first access point, and the power level, as reported by the client device, even though the power level reported by the client device may be inaccurate. The one or more processors may store information indicative of the physical layer rate associated with the power level between the client device and the first access point.

At some other time, it may have been possible that the client device and a second access point established a communication session. For instance, assume that the client device is a laptop or a smart phone, and based on the location of the client device, the client device and the second access point established a communication session. In this example, while the client device is in the communication session with the second access point, the one or more processors may request the client device to generate an 802.11k report, which includes information of the power level between the second access point and the client device, as well as power levels between other access points and the client device.

The one or more processors may also determine the physical layer rate between the second access point and the client device. The one or more processors may associate the physical layer rate, as reported by the second access point, and the power level, as reported by the client device, even though the power level reported by the client device may be inaccurate. The one or more processors may store information indicative of the physical layer rate associated with the power level between the client device and the second access point.

The one or more processors may repeat such operations at various times when the client device is in a communication with the different access points. In this way, the one or more processors may generate a database that includes information of physical layer rates and associated power levels between respective access points and a client device. For instance, for a first access point and a client device, the database may include information of the physical layer rates associated with each of a plurality of power levels, for a second access point and the client device, the database may include information of the physical layer rates associated with each of a plurality of power levels, and so forth. In some examples, rather than or in addition to the actual values of the physical layer rates and associated power levels, the one or more processors may generate and store mathematical functions that define the relationship between physical layers and power levels. Moreover, in some examples, the one or more processors may interpolate and/or extrapolate additional physical layer rates and associated power levels from measured physical layer rates and associated power levels.

In this way, the one or more processors may generate and store, in memory, information indicative of physical layer rates associated with power levels between a client device and respective access points of two or more access points. The respective physical layer rates may be physical layer rates between the client device and the respective access points, and the power levels may be information indicative of amounts of power in signals received by the client device from the respective access points as reported by the client device.

In the above example, the database is described as storing a database that associates physical layer rates and power levels between a client device and respective access points of two or more access points. However, there may be other factors or contexts that are used to associate the physical layer rates and power levels. For instance, in addition to physical layer rates, the one or more processors may associate factors such as band information, standard information, downstream spatial stream (downstreamSS) information, downstream modulation coding scheme (downstreamMCS) information, and channel bandwidth (channelBW) information. Description of these example factors is provided in more detail below.

As an example, the database may store information that indicates the physical layer rate associated with a power level for particular band information, standard information, downstreamSS information, downstreamMCS information, and channelBW information. For instance, the database may be considered as a multi-dimension database, wherein the dimensions of the database include power level, band information, standard information, downstreamSS information, downstreamMCS information, and channelBW information. Based on particular values for the power level, band information, standard information, downstreamSS information, downstreamMCS information, and channelBW information, the multi-dimensional database indicates the physical layer rate.

It should be understood that a multi-dimensional database is one example, and the example techniques do not require use of multi-dimensional database. Moreover, the example factors or contexts are provided for purposes of illustration only, and should not be considered limiting. There may be more, fewer, or different factors or contexts than the above examples.

As described above, in some cases, the amounts of power in signals received by the client device as reported by the client device may be inaccurate measures of the amounts of power in the signals received by the client device. However, because the power levels reported by the client device may be erroneous in the same way, and non-random, the one or more processors may utilize a current power level, as reported by the client device, to determine whether or not to switch a communication session. For instance, a client device that reports an erroneous power level may report the same erroneous power level at different times. That is, the error in the reported power level is consistent.

In accordance with one or more examples, during a communication session between a client device and a first access point of the two or more access points, the one or more processors may determine a current power level between the client device and a second access point of the two or more access points that is reported by the client device (e.g., in response for an 802.11k report). The one or more processors may access the stored information based on the current power level between the client device and the second access point to determine an expected physical layer rate between the client device and the second access point. That is, although the power level between the client device and second access point may be inaccurate, the one or more processors may still be able to determine what the expected physical layer rate should be between the client device and the second access point based on the stored information of what the physical layer rate is for the power level that the client device reported.

The one or more processors may determine a current physical layer rate between the client device and the first access point. In one or more examples, the one or more processors may determine whether to switch the communication session from between the client device and the first access point to the client device and the second access point based on the expected physical layer rate and the current physical layer rate. For instance, the one or more processors may determine whether to end the communication session of the client device with the first access point, and start a new communication session with the second access point. The one or more processors may cause the client device to switch communication session based on the determination of whether to switch.

Figure 1B:
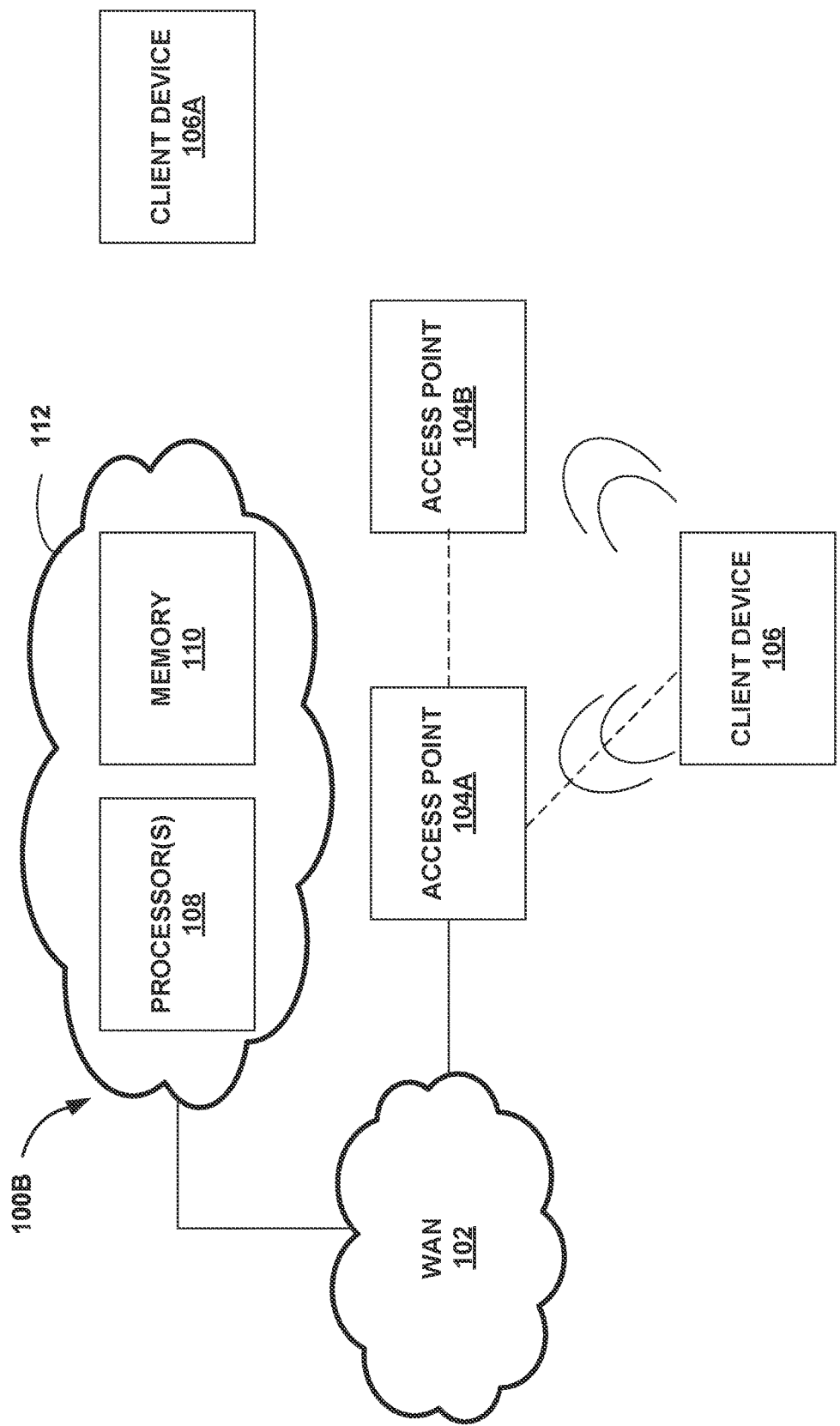
Figure 1C:
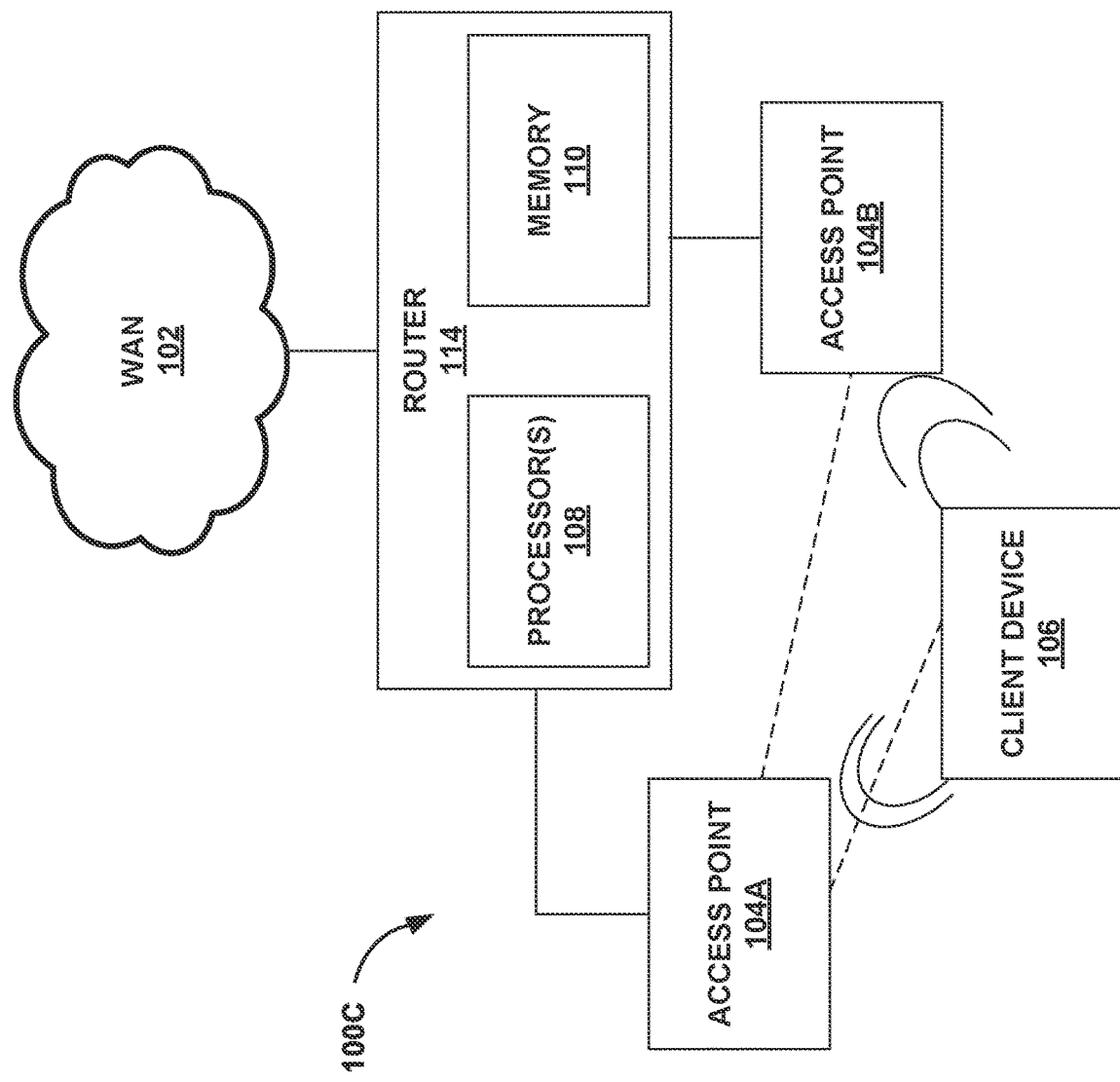

FIGS. 1A-1C are block diagrams illustrating example wireless communication systems, in accordance with one or more aspects of this disclosure. For instance, FIGS. 1A-1C illustrate wireless communication systems 100A-100C, respectively. Wireless communication systems 100A-100C may be multi-node channelized wireless networks, such as wireless networks that operate in accordance with the Wi-Fi protocols. Wireless communication systems 100A-100C may be wireless networks within a premise, such as a home, school, business, etc. However, the example techniques are not limited to requiring wireless communication systems 100A-100C be located within a single premise, and may extend across multiple buildings.

Wireless communication systems 100A-100C include access point 104A, access point 104B (collectively access points 104), and client device 106. For ease of illustration and description, wireless communication systems 100A-100C are shown with two access points and one client device. However, the techniques are not so limited. There may be two or more access points 104. Each of the two or more access points 104 may communicate with one or more client devices like client device 106.

In one or more examples, client device 106 may be configured to communicate with either access point 104A in one communication session or access point 104B in another communication session. Client device 106 may not communicate with both access points 104A, 104B in a same communication session. Hence, in this disclosure, when access points 104A, 104B are described as providing connectivity to client device 106, such description is referring to example cases where access points 104A, 104B provide such connectivity in situations where client device 106 is in a communication session with access point 104A or access point 104B.

Access points 104A, 104B may be networking hardware devices that provide wireless connectivity to client device 106. Examples of access points 104A, 104B include routers, extenders, repeaters, and the like. Examples of client device 106 includes subscriber devices that can communicate wirelessly such as computers, smartphones, smartwatches, tablet computing devices, Internet-of-Things (IoT) devices, and the like.

As illustrated in FIGS. 1A-1C, wireless communication systems 100A-100C may communicate with WAN 102. One example of WAN 102 is the Internet. For instance, as illustrated in FIGS. 1A and 1B, access point 104A provides access to WAN 102 to other access points (e.g., access point 104B) and client device 106. In FIGS. 1A and 1B, access point 104A may be considered as a gateway access point (e.g., AP-G). Access point 104B may be considered as a repeater access point (e.g., AP-R).

As illustrated in FIG. 1C, router 114 provides access to WAN 102 to access points 104A, 104B and client device 106. Router 114 may be coupled to access points 104A, 104B through a cabled (e.g., wired) connection, such as fiber optic cable, Ethernet cable, twisted pair cable, coaxial cables, etc.). For instance, in an enterprise setting, router 114 may be coupled to access points 104A, 104B through a cabled connection, and access points 104A, 104B may communicate with client device 106 wirelessly. However, it is possible for router 114 to communicate with access points 104A, 104B wirelessly as well.

FIGS. 1A-1C illustrate one or more processors 108 and memory 110. As described in more detail, one or more processors 108 (e.g., together with memory 110) may be configured to perform the example techniques described in this disclosure. Examples of one or more processors 108 include one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "controller" as used herein may refer to any of the foregoing structure or any other structure suitable for implementation of the techniques described herein. Also, the techniques could be fully implemented in one or more circuits or logic elements (e.g., such as in an integrated circuit (IC) or a set of ICs). Examples of memory 110 include RAM, ROM, EEPROM, optical disk storage, magnetic disk storage, flash memory, and the like.

In the example of FIG. 1A, one or more processors 108 and memory 110 may be part of access point 104A. For instance, access point 104A may be a gateway access point, and may be configured to monitor and analyze wireless communication system 100A. For instance, access point 104A may be configured to select whether client device 106 is to establish communication sessions with access point 104A or with access point 104B.

In the example of FIG. 1B, one or more processors 108 and memory 110 may be part of cloud computing environment 112, e.g., within one or more servers. Cloud computing environment 112 may provide storage and computing power for wireless communication system 100B. For instance, one or more processors 108 and memory 110 may be distributed across cloud computing environment 112. In one or more examples, in addition to providing storage and computing power to wireless communication system 100B, cloud computing environment 112 may monitor and analyze wireless communication system 100B (e.g., monitor bandwidth, determine whether any of access points 104A, 104B or client devices 106 are not operating correctly, assign client device 106A to access points 104A or 104B, and the like).

In the example of FIG. 1C, router 114 includes one or more processors 108 and memory 110. For instance, in an enterprise, router 114, which may be a gateway router, may be configured to analyze and monitor wireless communication system 100C, and, accordingly, one or more processors 108 and memory 110 may be part of router 114. In some examples, router 114 may be configured to select whether client device 106 is to establish communication sessions with access point 104A or with access point 104B. In some examples, router 114 may be a wired device that is coupled to access points 104A, 104B through a wired connection, but the techniques are not so limited.

FIGS. 1A-1C illustrate various example locations of one or more processors 108 and memory 110, but the example techniques should not be considered limited to these examples. One or more processors 108 and memory 110 may be located in other components as well.

In one or more examples, client device 106 may be in a communication session with access point 104A, but there may be benefit in switching the communication session from access point 104A to access point 104B. For instance, one or more processors 108 may be configured to periodically, or in response to a request, determine whether to switch, with which access point 104A, 104B, client device 106 is coupled. There may be various reasons to switch the communication session. As one example, the physical layer rate of client device 106 may fall below a desired rate. However, there may be other reasons to switch communication sessions.

One or more processors 108 may be configured to determine with which access point 104A, 104B client device 106 should communicate. For example, one or more processors 108 may be configured to optimize the end-to-end physical layer rate (PHY rate) of client device 106. In one or more examples, "end-to-end" refers to the path from WAN 102 through one or more of access points 104, and to client device 106, including one or more hops via satellite access points. For instance, in the example where client device 106 is communicated with access point 104B, the end-to-end path would include access point 104A, and access point 104A may be a satellite access point in this example.

In the example of FIGS. 1A-1C, client device 106 is currently in a communication session with access point 104A (e.g., client device 106 is coupled to or associated with access point 104A). One or more processors 108 may determine whether to steer client device 106 to access point 104B based on the end-to-end physical layer rate that client device 106 would achieve if client device 106 were to communicate through access point 104B.

In a multi-access point network, there may be one gateway access point (e.g., access point 104A), and one or more satellite access points (e.g., access point 104B). Satellite access points communicate to the gateway access point via a "backhaul" (BH) connection, and communicate at a BH PHY rate. Client device 106 may connect to the gateway access point (e.g., access point 104A) for a direct connection to WAN 102 or may connect to satellites (e.g., access point 104B) for a connection that is relayed by the satellite access point(s) to the gateway access point. The connection from client device 106 to the gateway access point (if direct connection) or satellite access point is called the fronthaul (FH) and has its own FH PHY rate.

As an example, assume that one or more processors 108 are to determine whether client device 106 is to steer (e.g., switch communication session) from access point 104A to access point 104B. In general, the end-to-end physical layer rate will be better with a direct connection to access point 104A (e.g., gateway access point) than through a repeater (e.g., access point 104B) to access point 104A because access point 104B will have to retransmit any transmissions received from client device 106 to go through access point 104A as well as transmissions from access point 104A destined for client device 106. All things being equal, the effective end-to-end physical layer rate through a repeater may be about one-half that of the actual physical layer rate with a direct connection to access point 104A. The formula for determining the end-to-end physical layer rate is: EtE data rate=1/(1/BH+1/FH), where BH is the backhaul physical layer rate, and FH is the fronthaul physical layer rate.

In one or more examples, one or more processors 108 may determine a current physical layer rate for client device 106. The current physical layer rate may be the fronthaul physical layer rate, which one or more processors 108 may determine from one of access points 104A, 104B with which client device 106 is communicating. That is, access points 104A, 104B may be configured to track the physical layer rate, and one or more processors 108 may query access points 104A or 104B for the physical layer rate. One or more processors 108 may then determine a current end-to-end physical layer rate based on the current physical layer rate and physical layer rates between one or more intermediate access points (if there are multiple hops) and WAN 102.

Using the example techniques described in this disclosure, one or more processors 108 may determine an expected physical layer rate between client device 106 and the other one of access points 104A or 104B. For instance, if client device 106 is in a communication session with access point 104A (e.g., a first access point), one or more processors 108 may determine an expected physical layer rate between client device 106 and access point 104B (e.g., a second access point). One or more processors 108 may determine an expected end-to-end physical layer rate based on the expected physical layer rate and physical layer rates between one or more intermediate access points and the WAN.

One or more processors 108 may compare the current end-to-end physical layer rate and the expected end-to-end physical layer rate, and determine to switch the communication session based on the current end-to-end physical layer rate being less than the expected end-to-end physical layer rate. For instance, if the expected end-to-end physical rate is greater than a threshold amount than the current end-to-end physical rate, one or more processors may switch the communication session from access point 104A to access point 104B (e.g., steer client device 106 to access point 104B). However, if the expected end-to-end physical rate is not greater than a threshold amount than the current end-to-end physical rate, one or more processors may not switch the communication session from access point 104A to access point 104B (e.g., keep client device communicating with access point 104A).

Directly measuring the end-to-end physical layer rate, or even the fronthaul physical layer rate between client device 106 and each one of access points 104A, 104B, and any other access points 104 can be time intensive, and therefore, disrupt the experience of the use of client device 106. However, downstream signal strength (RSSI) may be a proxy for the physical layer rate between access point 104A or 104B and client device 106. Downstream signal refers to signals that are transmitted from access points 104 to respective ones of client device 106. The downstream signal strength may be a measure of the power level of the signal that client device 106 receives that is measured at client device 106.

Downstream signal strength may be of importance because most common usage of bandwidth is client device 106 downloading data from WAN 102, as compared to client device 106 uploading data through WAN 102. For instance, upstream physical layer rates ratios relative to downstream physical layer rates can be 1:4 to 1:10 or more As described above, the Wi-Fi standard 802.11k provides for a way for client device 106 to determine the amounts of power in signals received by client device 106 from respective access points 104A, 104B as reported by client device 106. For instance, according to 802.11k, client device 106 may request signals from access points 104A and 104B. Client device 106 may generate a report (referred to as 802.11k report, or simply an 11k report) that includes information of the amount of power in the signal received from access point 104A and information of the amount of power in the signal received from access point 104B. However, many client devices, such as client device 106, in the marketplace incorrectly encode the 11k reports, making these reports, by themselves, less reliable for determining the best access points 104 for these client devices.

There may be alternative methods for determining the amount of power in signals received by client device 106

(e.g., alternative methods for determining downstream RSSI). As one example of an alternative method of estimating the downstream RSSI at client device 106 from a particular access point 104A or 104B transmitter is to measure the upstream RSSI of the client signal from the point of view of the particular access point 104A or 104B. In general, the signal path loss upstream is identical to the signal path loss downstream. Therefore, as long as the transmit power levels from access point 104A or 104B and client device 106 are identical, then the received power by client device 106 or access point 104A or 104B should be identical due to the path loss being identical in both directions if the frequency in both directions is the same. In Wi-Fi Time Division Duplex transmission, the frequency in both directions is the same.

However, there may be issues in using the upstream RSSI to approximate the downstream RSSI, which is a proxy for the physical layer rate. The transmit powers of client device 106 and access points 104A, 104B are not generally the same. Therefore, the received upstream power as measured by access points 104A, 104B may not be a good estimate of the received power at client device 106. In addition, the signal power of a probe transmitted by client device 106 for determining upstream RSSI may be different from data frame power, and high speed data frames may be sent at a lower power than low speed data frames to maintain signal fidelity of the complex high speed waveforms. Accordingly, there may be errors than can accumulate when indirectly trying to determine the downstream signal power using various upstream signal sources.

One approach to using the 11k report from client device 106, even if the 11k report is inaccurate, is to calibrate client device 106 in a lab environment and learn exactly how the report is in error and then compensate for the report error to reflect the real RSSI value (e.g., actual power level of signal received by client device 106). However, not all types of client device 106 may make the same type of error in the 11k report. Some examples of client device 106 may provide the correct 11k report, or client device 106 may initially provide an incorrect 11k report but sometime later, obtain a software upgrade that fixes the incorrect report. Other complicating scenarios are where examples of client device 106 that initially provide correct 11k reports, but subsequently are upgraded and provide incorrect 11k reports, or examples of client device 106 that have different types of 11k report errors depending on software load.

Although the 11k report may be inaccurate, in accordance with one or more examples described in this disclosure, in addition to or instead of using upstream RSSI, one or more processors 108 may utilize the 11k report along with stored information of the physical layer rates and reported downstream power levels to determine whether to switch communication sessions. For example, although the 11k reports may be inaccurate, the error in the 11k reports tends to repeatable, and not random, at least for certain contiguous periods of time. As an example, if the 11k report for client device 106 states that the power level is X when the actual power level is Y, the next time client device 106 receives a power level of Y, client device 106 will again report a power level of X (or at least a value close to X based on the measurement repeatability).

In one or more examples, the 11k reports may be repeatable, as described above, and may also be repeatedly increasing or decreasing. As one example, the 11k reports may be monotonically increasing or decreasing. For instance, if the measured power level is increasing, the physical rate should correspondingly increase, and if the measurement power level is decreasing, the physical rate should correspondingly decrease. Due to incorrectly encoded 11k reports it may be possible, for the physical rate to increase, as the client reported power level decreases, and the techniques described in this disclosure would operate in a similar manner. That is, in some examples, in the 11k reports, the changes in power level measurements and changes in physical rate measurements should correlate, and if one increases, the other should increase or decrease in a consistent manner, and if one decreases, the other should decrease or increase in a consistent manner. In one or more examples, the 11k reports either increase or decrease monotonically with the actual physical layer received power levels.

For ease of description, in this disclosure, increases in power level are described as corresponding to increases in physical layer rate, but the example techniques are not so limited. It may be possible for increasing power level to correspond to decreases in physical layer rate.

In some examples, access points 104A, 104B are periodically sending out beacons which can be measured by client device 106. The disadvantage of measuring these periodic beacons is that client device 106 may be required to listen for hundreds of milliseconds for these periodic beacons. A more efficient and faster technique may be for one or more processors 108 to instruct client device 106 (e.g., through access point 104A, assuming that client device 106 is communicating with access point 104A) to for an 11k report request that asks client device 106 to send probe requests to access points 104A, 104B. Client device 106 listens for and measures the resulting probe responses. Client device 106 may then report the power levels, as measured at client device 106.

Generation of the 11k report may be to obtain power measurements from non-associated access points (e.g., access points with which client device 106 does not have a communication session). In accordance with one or more examples, client device 106 takes measurements of access point 104A, with which client device 106 has a current communication session. In this way, one or more processors 108 may obtain continuous physical layer rate measurements of client device 106 on access point 104A (e.g., the access point with which client device 106 is associated). By requesting the 11k report on the associated access point, one or more processors 108 may calibrate the 11k report values to the current physical layer rate values for an accurate and custom table for access point 104A and client device 106.

For example, there may be an initial time period during which time one or more processors 108 are generating and storing the information in memory 110 that one or more processors 108 will use later to determine with which access point 104A or 104B client device 106 is to couple (e.g., communicate with, be associated with, establish a communication session with, etc.). In this initial time period, in a first duration, one or more processors 108 may have determined that client device 106 is to communicate through access point 104A. During this first duration in the initial time period, one or more processors 108 may request client device 106 to generate 802.11k reports (i.e., 11k reports). Client device 106 may generate these 802.11k reports that indicate the received power level from access point 104A, as well as from access point 104B. For each request for an 802.11k report, one or more processors 108 may also request from access point 104A, the physical layer rate at which access point 104A is transmitting to client device 106. One or more processors 108 may associate the reported power level between access point 104A and client device 106, as reported by client device 106, and the physical layer rate, as reported by access point 104A.

As an example, assume that client device 106 reported that the power level is X', and access point 104A reported that the physical layer rate is Y'. In this example, one or more processors 108 may store in memory 110 that for client device 106 and access point 104A, a power level of X' is associated with a physical layer rate of Y'.

For ease, the above example is described one or more processors 108 storing that for client 106 and access point 104A, a power level of X' is associated with a physical layer rate of Y'. However, in some examples, there may be additional factors or contexts that one or more processors 108 also determines. One or more processors 108 may associate these additional factors or contexts along with the power level to the physical layer rate.

As an example, for client device 106 and access point 104A, one or more processors 108 may determine, along with the power level of X', band information, standard information, downstream spatial stream (downstreamSS) information, downstream modulation coding scheme (downstreamMCS) information, and channel bandwidth (channelBW) information. One or more processors may store in memory 110 that for client device 106 and access point 104, a power level of X' and particular values for band information, standard information, downstream spatial stream (downstreamSS) information, downstream modulation coding scheme (downstreamMCS) information, and channel bandwidth (channelBW) information are all associated with a physical layer rate of Y'.

The band information refers to the frequency band. Examples of the frequency band include 2.4 GHz, 5 GHz, or 6 GHz.

The standard information refers to communication standard that an access point and a client device can support, and tends to be highest standard that both the access point and the client device can support. For example, the standard information may be considered as least advanced of (most advanced standard a client device claims to support on the band, most advanced standard the access point is provisioned to support).

The downstreamSS information refers to the number of spatial streams that can be supported. For example, the downstreamSS information may be considered as the minimum of (number of Rx spatial streams a client device claims to support on the band, number of Tx spatial streams supported by the access point).

The downstreamMCS information refers to modulation coding scheme that can be supported. For example, downstreamMCS information may be considered as minimum of (highest Rx MCS a client device claims to support on the band, highest Tx MCS the access point supports).

The channelBW information refers to the bandwidth that can be supported. For example, the channelBW may be considered as minimum of (widest BW client device claims to support on the band, current operational BW the access point is employing). In one or more example, the channelBW is based on the actual operational bandwidth of the access point, and may not be based on the bandwidth that the access point is provisioned. In some cases, the operational bandwidth and the provisioned bandwidth may be the same, but the example techniques are not so limited.

It should be noted that the above contexts or factors are provided merely as examples, and should not be considered limiting. There may be more, fewer, or different contexts or factors described above.

The power level that client device 106 reports, even when coupled to access point 104A can change. For instance, if client device 106 moves towards access point 104A, then the power level that client device 106 reports may increase. If there is an increase in interference between client device 106 and access point 104A, then the power level that client device 106 reports may decrease.

Accordingly, for a pairing between client device 106 and access point 104A, one or more processors 108 may generate a table stored in memory 110. The table may indicate the power level, as reported by client device 106, and the associated physical layer rate, as reported by access point 104A. In some examples, the table may include information of the additional contexts or factors described above, and may be a multi-dimensional table, as a non-limiting example, where each of the dimensions corresponds to one of the contexts or factors. There may be a plurality of entries in the table for each of the different power levels that client device 106 reports, and may also include entries for the example contexts and factors, in response to a request for an 11k report, and the associated physical layer rates.

In this case, the power levels reported by client device 106 may be inaccurate. However, because client device 106 is consistently inaccurate in the same way, if client device 106 reports a particular power level, even if incorrect, one or more processors 108 may be able to determine what the physical layer rate is expected to be based on the stored information. For instance, in the above example, when client device 106 reported a power level of X', the physical layer rate was Y'. Therefore, when client device 106 reports a power level of X', even if inaccurate, the physical layer rate should be approximately Y'.

One or more processors 108 may repeat the above example techniques to generate information indicative of reported power levels and associated physical layer rates for each of access points 104A, 104B. For instance, during the initial time period, during a second duration, one or more processors 108 may have determined that client device 106 is to communicate through access point 104B. During this second duration in the initial time period, one or more processors 108 may request client device 106 to generate 802.11k reports. Client device 106 may generate these 802.11k reports that indicate the received power level from access point 104B, as well as from access point 104A. For each request for an 802.11k report, one or more processors 108 may also request from access point 104B, the physical layer rate at which access point 104B is transmitting to client device 106. One or more processors 108 may associate the reported power level between access point 104B and client device 106, as reported by client device 106, and the physical layer rate, as reported by access point 104B. Also, in examples where the additional contexts or factors are utilized, one or more processors 108 may associate the combination of the reported power level and example contexts or factors with the physical layer rate.

Similar to above, the power level that client device 106 reports, even when coupled to access point 104B can change. For instance, if client device 106 moves towards access point 104B, then the power level that client device 106 reports may increase. If there is an increase in interference between client device 106 and access point 104B, then the power level that client device 106 reports may decrease.

Accordingly, for a pairing between client device 106 and access point 104B, one or more processors 108 may generate a table stored in memory 110. The table may indicate the power level, as reported by client device 106, and the associated physical layer rate, as reported by access point 104B. Similar to description above for access point 104A, in some examples, the table may include information of the additional contexts or factors described above, and may be a multi-dimensional table, as a non-limiting example, where each of the dimensions corresponds to one of the contexts or factors. There may be a plurality of entries in the table for each of the different power levels that client device 106 reports, and may also include entries for the example contexts and factors, in response to a request for an 11k report, and the associated physical layer rates.

Although the above example describes memory 110 storing tables that include the physical layer rate associated with a power level, the example techniques are not so limited. Rather than or in addition to using a table, one or more processors 108 may determine respective mathematical functions that define a relationship between the physical layer rates associated with respective power levels. For instance, one or more processors 108 may determine a first mathematical function that defines the relationship between the physical layer rates and the power levels for access point 104A and client device 106, and determine a second mathematical function that defines the relationship between the physical layer rates and the power levels for access point 104B and client device 106, and so forth. Tables and mathematical functions are provided as examples, and should not be considered limiting.

In this way, memory 110 may be configured to store information indicative of physical layer rates associated with power levels between client device 106 and respective access points 104 of two or more access points 104. For instance, the respective physical layer rate may be physical layer rates between client device 106 and respective access points 104 (e.g., as measured by respective access points 104). The power levels may be information indicative of amounts of power in signals received by client device 106 from the respective access points 104 as reported by client device 106.

As an example, memory 110 may store a first set of information indicative of a first set of physical layer rates associated with a first set of power levels. The first set of physical layer rates are physical layer rates between client device 106 and access point 104A (e.g., a first access point), and the first set of power levels may be information indicative of an amount of power in a signal transmitted by access point 104A (e.g., the first access point) and received by client device 106 that is reported by client device 106. The first set of information may also include other contexts and factors for each of the physical layer rates in the first set of physical rates and power levels in the first set of power levels. The contexts and factors may include band information, standard information, downstreamSS information, downstreamMCS information, and channelBW information, as a few examples.

That is, for a first power level of the first set of power levels, one or more processors 108 may also determine additional contexts and factors such as the band information, standard information, downstreamSS information, downstreamMCS information, and channelBW information. Memory 110 may store information indicative of a first physical layer of the first set of physical layers associated with the first power level and the additional contexts or factors. One or more processors 108 may repeat such operations for a second power level of the first set of power levels, and store such information in memory 110.

Memory 110 may also store a second set of information indicative of a second set of physical layer rates associated with a second set of power levels. The second set of physical layer rates may be physical layer rates between client device 106 and access point 104B (e.g., a second access point), and the second set of power levels may be information indicative of an amount of power in a signal transmitted by access point 104B (e.g., the second access point) and received by client device 106 that is reported by client device 106. Similar to above, the second set of information may also include other contexts and factors for each of the physical layer rates in the second set of physical rates and power levels in the second set of power levels. The contexts and factors may include band information, standard information, downstreamSS information, downstreamMCS information, and channelBW information, as a few examples.

That is, for a first power level of the second set of power levels, one or more processors 108 may also determine additional contexts and factors such as the band information, standard information, downstreamSS information, downstreamMCS information, and channelBW information. Memory 110 may store information indicative of a first physical layer of the second set of physical layers associated with the first power level and the additional contexts or factors. One or more processors 108 may repeat such operations for a second power level of the second set of power levels, and store such information in memory 110.

The above describes some example ways in which one or more processors 108 may generate information indicative of physical layer rates associated with power levels between client device 106 and respective access points 104. However, the example techniques are not so limited. As one example, one or more processors 108 may interpolate or extrapolate physical layer rates and associated power levels, where the interpolation or extrapolation may be to predict physical layer rates and associated predicted power levels. For instance, one or more processors may interpolate or extrapolate predicted physical layer rates associated with predicted power levels between client device 106 and the respective access points 104 based on the stored information, and store the predicted physical layer rates associated with the predicted power levels as additional information indicative of the physical layer rates associated with the power levels between client device 106 and the respective access points 104.

In this way, rather than one or more processors 108 acquiring 11k reports for every single physical layer rate and power level, one or more processors 108 may interpolate or extrapolate physical layer rates and power levels from the physical layer rates reported by access points 104 and the power levels reported by client device 106. In one or more examples, one or more processors 108 may use cure fitting or machine learning algorithms to interpolate or extrapolate from 11k reports when there is no corresponding physical layer rate for a given power level.

As another example, during the initial time period, and in the first duration, for the same physical layer rate between access point 104A and client device 106, it may be possible that client device 106 reported multiple different power levels. Similarly, for the same power levels that client device 106 reported, it may be possible that there were multiple different physical layer rates. The same may be true during the second duration for the access point 104B/client device 106 pairing.

In one or more examples, to generate the information indicative of physical layer rates associated with power levels between client device 106 and the respective access points 104, one or more processors 108 may be configured to determine a plurality of physical layer rates associated with one power level between client device 106 and the respective access points 104, and determine statistics of the plurality of physical layer rates. For instance, one or more processors 108 may determine mean and standard distribution. One or more processors 108 may determine one physical layer rate based on the statistics (e.g., a physical layer rate that is one standard deviation away from the mean). One or more processors 108 may associate the determined physical layer rate with the one power level.

Moreover, in some examples, one or more processors 108 may be configured to determine whether determined physical layer rate and power level association is valid. For instance, as described above, the power level measurement, even if inaccurate, should monotonically increase or decrease with changes in the physical layer rate. However, if one or more processors 108 determines that a power level measurement did not monotonically increase or decrease with changes in the physical layer rate, one or more processors 108 may determine that the power level measurement and physical layer rate association is invalid, and may not rely on such information.

For instance, assume that the power level measurement monotonically increases with the increase in physical layer rate. In this example, for any two physical layer rate measurements, the power level associated with the higher physical layer rate should be greater than the power level associated with the lower physical layer rate. In some examples, if the power level associated with the higher physical layer rate is less than the power level associated with the lower physical layer rate, the association of the power level to the physical layer rate may be invalid.

However, in some cases, it may be possible for power level to be the same or within a certain tolerance range for two different physical layer rates. For instance, there may be plateauing of power level even as there is increase in physical layer rates. As an example, the power level may grow monotonically from lowest physical layer rate to 800 Mbps, and then plateau (e.g., the power level is the same for 800 Mbps as is for 900 Mbps). In this case, one or more processors 108 may determine that such association of power level and physical layer rate is valid, and may rely on such association.

As described, in some examples, the power level plateaus, but the physical layer rate continues to increase. For instance, in an example, the real physical power increases from −70 dBm, −60 dBm, −30 dBm but the 11k report stays the same or is almost flat (e.g., the 11k report indicates that the power level plateaued or is within a tolerance range). An almost flat curve could be considered monotonically rising, but any random noise on the power measurement may result in fluctuations in the physical layer rate predictions over the 'almost flat' region of the table. In some such examples, one or more processors 108 may discard such measurements due to unreliability.

In some examples, the power levels plateau, per the 11k report, where the physical layer rate is static while the power continues to increase. In such cases, one or more processors 108 may compensate for such plateauing. For instance, there may be a maximum physical layer rate between the access points 104A,104B and client device 106 that cannot be exceeded no matter how much power is received. In such examples, one or more processors 108 may generate the table to indicate that for all power levels above a threshold, the physical layer rate is equal to the maximum physical layer rate between the access points 104A,104B and client device 106.

In general, there may be various ways in which to determine whether an association between the power level and the physical layer rate is valid or invalid. The above example techniques to classify an association between the power level and the physical layer rate as valid or invalid should not be considered limiting.

Accordingly, with enough sample points over a range of power levels, one or more processors 108 may create a table or mathematical function to predict physical layer rate from 11k report values for a particular pair of client device 106 and access points 104A, 104B. That is, one or more processors 108 may generate the information indicative of physical layer rates associated with power levels between client device 106 and the respective access points 104 of the two or more access points 104 during prior communication sessions between client device 106 and the respective access points 104, such as during the initial time period. Stated another way, during the initial time period, such as the first duration and the second duration, one or more processors 108 may build up the tables and/or mathematical functions that indicate the association between the power levels, as reported by client device 106, and respective physical layer rates, as reported by access points 104.

In one or more examples, during the initial time period, it may be beneficial for client device 106 to associate with and operate each of access points 104 (e.g., multiple durations) over a sufficient dynamic range of power levels and physical layer rates to create a sufficiently sampled 11k/physical layer rate function. Client device 106 may connect to each of access points 104 during the initial time period to generate the tables and/or mathematical functions either from self-roaming or by using steering techniques based on upstream probe or data measurements. After the initial time period, there may be power levels and associated physical layer rates for each pair of client device 106 and access points 104.

The above described some example techniques for one or more processors 108 to generate tables and/or mathematical functions that associate power levels, as reported by client device 106, and physical layer rates, as reported by access points 104. In some examples, even with interpolation or extrapolation, it may take time for client device 106 to generate enough 11k reports so that one or more processors 108 can associate physical layer rates and power levels. One way to accelerate the process may be by sharing data from other Wi-Fi networks on similar types of clients devices as client device 106 (e.g., same make, model, manufacturer, as client device 106). For instance, it may be assumed that similar client devices as client device 106 have the same error in generating the 11k reports, but should have the same reported power level, even if inaccurate, to physical layer rate relationships. In some examples, "default" power level to physical layer rate tables may be obtained by doing lab measurements of classes of client devices that are same as client device 106 and access points 104 and looking for classes of types of client devices which are consistent in using a specific power level to physical layer rate relationship.

In some examples, prior to the initial time period, the tables indicating the physical layer rate and power level association maybe empty. However, no matter whether the tables begin completely empty or a default table is available to start with, one or more processors 108 may be configured to update the tables based on in field experience. In this way, if a software load changes the power level to physical layer rate relationship in the 11k tables, one or more processors 108 may accommodate the new load and the tables will regain accuracy after some time. If one or more processors 108 determine that there have been a series of significant differences in the actual physical layer rates for reported power levels, one or more processors 108 may determine that there is a software change, and one or more processors 108 may clear the tables, and create a new set of tables.

Once sufficient samples of 11k reports are obtained from client device 106 for each of the respective access points 104, one or more processors 108 may utilize the tables or mathematical functions, as two examples, for steering decision on whether to switch a current communication session for client device 106, on the basis that the physical layer rates vs 11k-reported power levels roughly hold across access points 104.

For instance, after the initial time period, during a communication session between client device 106 and a first access point (e.g., access point 104A) of the two or more access points 104, one or more processors 108 may determine whether it is appropriate to switch the communication session of client device 106 (e.g., steer client device 106 to another one of access points 104). To determine whether to switch the communication session, one or more processors 108 may determine the physical layer rate that would be present if client device 106 were to steer to a new access point (e.g., steer from access point 104A to access points 104B). To determine the physical layer rate that would be present if client device 106 were to steer to a new access point, one or more processors 108 may determine the power level at which client device 106 would receive power from the new access point.

In one or more examples, during the communication session between client device 106 and the first access points (e.g., access points 104A), one or more processors 108 may determine a current power level between client device 106 and a second access point (e.g., access points 104B) of the two or more access points 104 that is reported by client device 106. That is, one or more processors 108 may determine what the expected power level is going to be if client device 106 steers to access points 104B.

To determine the power level, during the communication session between client device 106 and access point 104A, one or more processors 108 may transmit a request to the client device for generating a report in accordance with the Institute of Electrical and Electronics Engineers (IEEE) 802.11k standard. One or more processors 108 may receive, from client device 106, the report (e.g., the 11k report), and determine the current power level between client device 106 and the second access point (e.g., access point 104B) during the communication session between client device 106 and the first access point (e.g., access points 104A) based on the received report. In other words, although the communication session may be between client device 106 and access point 104A, the 802.11k report allows one or more processors 108 to determine what the power level that client device 106 would be if client device 106 would communicate with access point 104B.

It should be reiterated that the power level at which client device 106 may receive from access points 104B, as reported by client device 106 may not be accurate. However, because during the initial time period, one or more processors 108 associated the reported power level with the actual physical layer rate, one or more processors 108 may be able to determine the physical layer rate that should be expected if client device 106 were steered to communicated through access point 104B.

For example, one or more processors 108 may access the stored information (e.g., stored in memory 110) based on the current power level between client device 106 and the second access point (e.g., access point 104B) to determine an expected physical layer rate between client device 106 and the second access point. For instance, one or more processors 108 may utilize the power level that client device 106 reported for communicating with access point 104B as an input into the table stored in memory 110 that indicates the physical layer rates associated with respective power levels. One or more processors 108 may determine the physical layer rate based on the table, where the determined physical layer rate from the table is the expected physical layer rate between client device 106 and access point 104B. In other words, the expected physical layer rate, as determined from the table stored in memory 110, is indicative of what the physical layer rate would be if client device 106 were to communicate through access point 104B.

One or more processors 108 may determine a current physical layer rate between the client device 106 and the first access point (e.g., access point 104A). In this example, client device 106 is currently in a communication session with access point 104A. As described above, access points 104 may be configured to track the physical layer rate when communicating with client device 106. Accordingly, one or more processors 108 may be configured to determine the physical layer rate between access point 104A and client device 106 from access point 104A.

One or more processors 108 may determine whether to switch the communication session from between client device 106 and the first access point (e.g., access point 104A) to client device 106 and the second access point (e.g., access point 104B) based on the expected physical layer rate and the current physical layer rate. For instance, one or more processors 108 may determine whether to end the communication session with access point 104A, and start new communication session with access point 104B to steer client device 106 from access point 104A to access point 104B.

In some examples, to determine whether to switch the communication session, one or more processors 108 may determine the end-to-end physical layer rates based on the current physical layer rate and the expected physical layer rate. For instance, one or more processors 108 may determine a current end-to-end physical layer rate based on the current physical layer rate and physical layer rates between one or more intermediate access points 104 (e.g., assuming that are additional access points 104) and WAN 102. One or more processors 108 may determine an expected end-to-end physical layer rate based on the expected physical layer rate and physical layer rates between one or more intermediate access points 104 and WAN 102.

One or more processors may compare the current end-to-end physical layer rate and the expected end-to-end physical layer rate, and determine to switch the communication session based on the current end-to-end physical layer rate being less than the expected end-to-end physical layer rate. For example, if the current end-to-end physical layer rate is less than a threshold amount from the expected end-to-end physical layer rate, then there may be benefit in steering client device 106 to access point 104B. If the current end-to-end physical layer rate is not less than a threshold amount from the expected end-to-end physical layer rate, then there may not be benefit in steering client device 106 to access point 104B, and client device 106 may remain coupled to access point 104A. In this manner, one or more processors 108 may cause client device 106 to switch communication session based on the determination of whether to switch.

In the above examples, one or more processors 108 determined the expected physical layer rate based on the information stored in memory 110. In some examples, one or more processors 108 may also determine the expected physical layer rate utilizing some other techniques, such based on the upstream power level measured by access points 104. For instance, the expected physical layer rate based on the information stored in memory 110, using the techniques described in this disclosure, may be a first expected physical layer rate.

One or more processors 108 may determine a second expected physical layer rate, such as based on respective power levels between client device 106 and the respective access points 104 that are reported by the respective access points 104 (e.g., the upstream power levels). In one or more examples, one or more processors 108 may determine whether to utilize the first expected physical layer rate or the second expected physical layer rate. For example, one or more processors 108 may consider what the historical accuracy of the two estimations of the physical layer rate (e.g., the first and second expected physical layer rates) that result once client device 106 associates, to make a decision on whether to use the first expected physical layer rate or the second expected physical layer rate.

In one or more examples, to determine whether to switch the communication session, one or more processors 108 may be configured to determine whether to switch the communication session based on the first expected physical layer rate in response to the determination to utilize the first expected physical layer rate. For instance, with enough steering or roaming events for client device 106, and a sufficiently large table associating power levels and physical layer rates, one or more processors 108 may be able to ascertain the more accurate technique of determining the expected physical layer rate. One or more processors may then use the more accurate technique (e.g., between tables and/or mathematical functions stored in memory 110 or upstream power levels) and use the same in the future.

Figure 2:
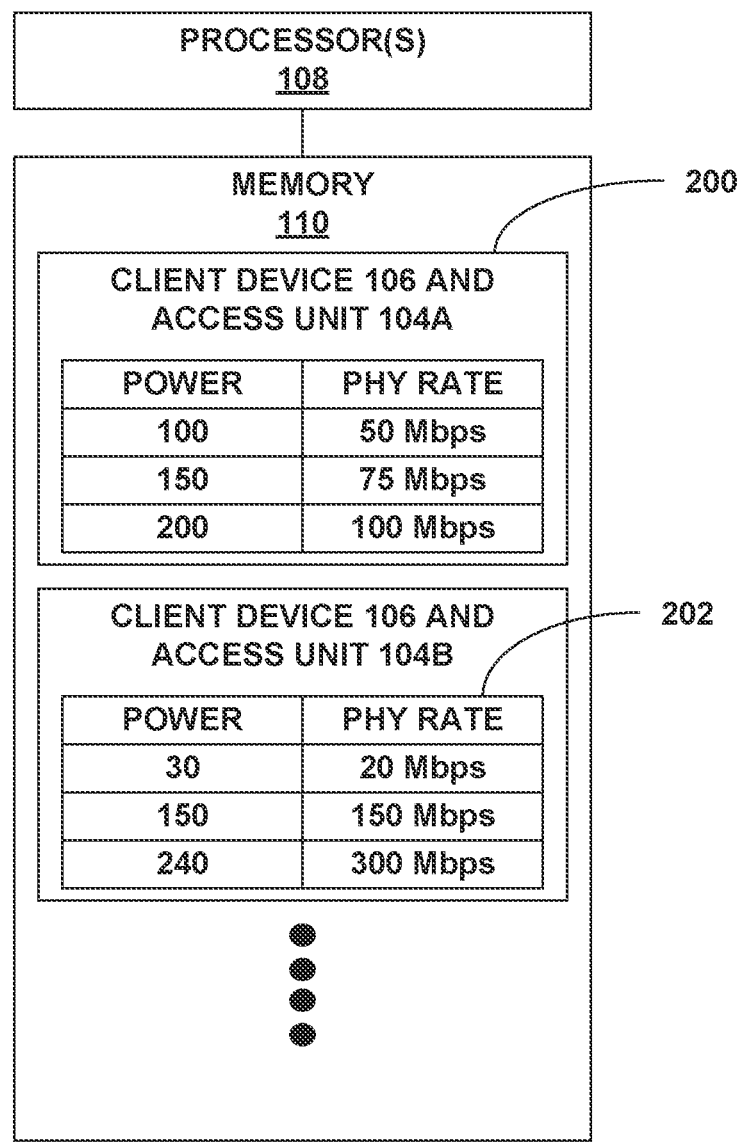
FIG. 2 is a block diagram illustrating an example of one or more processors and memory, in accordance with one or more aspects of this disclosure.

FIG. 2 is a block diagram illustrating an example of one or more processors and memory, in accordance with one or more aspects of this disclosure. For purposes of illustration, FIG. 2 illustrates an example in which one or more processors 108 generated table 200 and table 202 during the initial time period to create tables 200 and 202 for later utilization of determining whether to steer client device 106. In the example of FIG. 2, the information indicative of the physical layer rates associated with respective power levels may be respective tables 200 and 202 that include information of physical layer rates and associated power levels. However, in some examples, rather than or in addition to tables 200 and 202, the information indicative of the physical layer rates associated with respective power levels may be respective mathematical functions that define a relationship between the physical layer rates associated with respective power levels.

In general, there may be various ways in which memory 110 may be configured to store information indicative of physical layer rates associated with power levels between client device 106 and respective access points 104 of two or more access points 104. As described, the respective physical layer rates may be physical layer rates between client device 106 and the respective access points 104, and the power levels may be information indicative of amounts of power in signals received by client device 106 from the respective access points 104 as reported by client device 106.

For instance, during the initial time period, in a first duration, client device 106 and access unit 104A may be in a communication session (e.g., such as due to self-roaming). In this first duration, one or more processors 108 may periodically request for 11k reports from client device 106. For instance, in response to a first request for 11k reports, client device 106 may report that the power level is 100 at client device 106. One or more processors 108 may also receive from access point 104A the physical layer rate, which in the example of FIG. 2 is 50 Mbps. In this example, one or more processors 108 may create an entry in table 200 that associates the power level of 100, as reported by client device 106, with physical layer rate of 50 Mbps, as reported by access point 104A.

Although not illustrated, in some examples, table 200 may also include additional contexts or factors such as the band information, standard information, downstreamSS information, downstreamMCS information, and channelBW information. That is, the entry of table 200 that shows power level 100 and physical layer rate 50 Mbps, may include additional factors, other than just the power level. For instance, table 200 may include entries for power level, as well as one or more of band information, standard information, downstreamSS information, downstreamMCS information, and channelBW information that are associated with the physical layer rate.

In the first duration of the initial time period, in response to a second request for 11k reports, client device 106 may report that the power level is 150 at client device 106. One or more processors 108 may also receive from access point 104A the physical layer rate, which in the example of FIG. 2 is 75 Mbps. In this example, one or more processors 108 may create an entry in table 200 that associates the power level of 150, as reported by client device 106, with physical layer rate of 75 Mbps, as reported by access point 104A.

In the first duration of the initial time period, in response to a third request for 11k reports, client device 106 may report that the power level is 200 at client device 106. One or more processors 108 may also receive from access point 104A the physical layer rate, which in the example of FIG. 2 is 100 Mbps. In this example, one or more processors 108 may create an entry in table 200 that associates the power level of 200, as reported by client device 106, with physical layer rate of 100 Mbps, as reported by access point 104A.

In this way, one or more processors 108 may generate table 200. In some examples, one or more processors 108 may repeatedly confirm, with multiple 11k reports, that when the power level is reported at 100, that the physical layer rate is 50 Mbps, and similar confirmation for power level of 150 and 75 Mbps, and for power level of 200 and 100 Mbps. In some examples, for each power level, one or more processors 108 may determine that there are different physical layer rates. One or more processors 108 may determine statistics, such as mean and standard deviation, and use the statistics to generate a physical layer rate that one or more processors 108 enters into table 200.

As an example, to generate the information indicative of physical layer rates associated with power levels between client device 106 and access point 104A, one or more processors 108 may determine a plurality of physical layer rates associated with one power level between client device 106 and access point 104A. One or more processors 108 may determine statistics of the plurality of physical layer rates, and determine one physical layer rate based on the statistics (e.g., mean physical layer rate, or mean physical layer rate plus one standard deviation, etc.). One or more processors 108 may associate the determined physical layer rate with the one power level in table 200.

In some examples, rather than measuring each of the power levels and physical layer rates, one or more processors 108 may interpolate or extrapolate using curve fitting, machine learning, averaging, etc. power level values and physical layer rates. For instance, one or more processors 108 may interpolate or extrapolate predicted physical layer rates associated with predicted power levels between client device 106 and access point 104A based on the stored information. As an example, one or more processors 108 may interpolate or extrapolate a predicted physical layer rate associated with a predicted power level of 250 based on the power levels of 100, 150, and 200 and associated physical layer rates of 50, 75, and 100 Mbps, respectively. One or more processors 108 may store the predicted physical layer rates associated with the predicted power levels as additional information indicative of the physical layer rates associated with the power levels between client device 106 and access point 104A. That is, one or more processors 108 may create an entry in table 200 to include physical layer rate for power level of 250 without actually receiving an 11k report in which client device 106 reported a power level of 250.

One or more processors 108 may generate table 202 similar to table 200. For instance, during the initial time period, in a second duration, client device 106 and access unit 104B may be in a communication session (e.g., such as due to self-roaming). In this second duration, one or more processors 108 may periodically request for 11k reports from client device 106. For instance, in response to a first request for 11k reports, client device 106 may report that the power level is 30 at client device 106. One or more processors 108 may also receive from access point 104B the physical layer rate, which in the example of FIG. 2 is 20 Mbps. In this example, one or more processors 108 may create an entry in table 202 that associates the power level of 30, as reported by client device 106, with physical layer rate of 20 Mbps, as reported by access point 104B.

Similar to description of table 200, although not illustrated, in some examples, table 202 may also include additional contexts or factors such as the band information, standard information, downstreamSS information, downstreamMCS information, and channelBW information. That is, the entry of table 202 that shows power level 30 and physical layer rate 20 Mbps, may include additional factors, other than just the power level. For instance, table 202 may include entries for power level, as well as one or more of band information, standard information, downstreamSS information, downstreamMCS information, and channelBW information that are associated with the physical layer rate.

In the second duration of the initial time period, in response to a second request for 11k reports, client device 106 may report that the power level is 150 at client device 106. One or more processors 108 may also receive from access point 104B the physical layer rate, which in the example of FIG. 2 is 150 Mbps. In this example, one or more processors 108 may create an entry in table 202 that associates the power level of 150, as reported by client device 106, with physical layer rate of 150 Mbps, as reported by access point 104B.

In the second duration of the initial time period, in response to a third request for 11k reports, client device 106 may report that the power level is 240 at client device 106. One or more processors 108 may also receive from access point 104B the physical layer rate, which in the example of FIG. 2 is 300 Mbps. In this example, one or more processors 108 may create an entry in table 202 that associates the power level of 240, as reported by client device 106, with physical layer rate of 300 Mbps, as reported by access point 104B.

In this way, one or more processors 108 may generate table 202. In some examples, one or more processors 108 may repeatedly confirm, with multiple 11k reports, that when the power level is reported at 30, that the physical layer rate is 20 Mbps, and similar confirmation for power level of 150 and 150 Mbps, and for power level of 240 and 300 Mbps. In some examples, for each power level, one or more processors 108 may determine that there are different physical layer rates. One or more processors 108 may determine statistics, such as mean and standard deviation, and use the statistics to generate a physical layer rate that one or more processors 108 enters into table 202.

As an example, to generate the information indicative of physical layer rates associated with power levels between client device 106 and access point 104B, one or more processors 108 may determine a plurality of physical layer rates associated with one power level between client device 106 and access point 104B. One or more processors 108 may determine statistics of the plurality of physical layer rates, and determine one physical layer rate based on the statistics (e.g., mean physical layer rate, or mean physical layer rate plus one standard deviation, etc.). One or more processors 108 may associate the determined physical layer rate with the one power level in table 202.

In some examples, rather than measuring each of the power levels and physical layer rates, one or more processors 108 may interpolate or extrapolate using curve fitting, machine learning, averaging, etc. power level values and physical layer rates. For instance, one or more processors 108 may interpolate or extrapolate predicted physical layer rates associated with predicted power levels between client device 106 and access point 104B based on the stored information. As an example, one or more processors 108 may interpolate or extrapolate a predicted physical layer rate associated with a predicted power level of 300 based on the power levels of 30, 150, and 220 and associated physical layer rates of 20, 150, and 300 Mbps, respectively. One or more processors 108 may store the predicted physical layer rates associated with the predicted power levels as additional information indicative of the physical layer rates associated with the power levels between client device 106 and access point 104B. That is, one or more processors 108 may create an entry in table 202 to include physical layer rate for power level of 300 without actually receiving an 11k report in which client device 106 reported a power level of 300.

In FIG. 2, the information in tables 200 and 202 are illustrated as monotonically increasing. For instance, as the measurement power level increases, the measured physical layer rate also increases. In monotonically increasing, as the measured power level increases, the physical layer rate should also keep increasing, and not decrease. Although shown as monotonically increasing, in some examples, the physical rate and power level may be related as monotonically decreasing. For instance, in monotonically decreasing, as the power level measurement increases, the measured physical layer rate may decrease, and as the power level measurement decreases, the measured physical rate may increase.

In one or more examples, the 11k report is reporting received power, not physical rate. However, with increased power, the physical rate may generally increase. There is a general relationship with received power and physical rate, but it may be possible that to have the same physical rate with the same power since physical rate is a result of hunting for the highest rate that may be supported for a given received power. As an algorithm for hunting hunts even though the power does not change, the physical rate may go up and down around an average.

In the example of FIG. 2, memory 110 may be configured to store a first set of information indicative of a first set of physical layer rates associated with a first set of power levels (e.g., table 200). In table 200, the first set of physical layer rates may be physical layer rates between client device 106 and the first access point (e.g., access point 104A), and the first set of power levels may be information indicative of an amount of power in a signal transmitted by the first access point (e.g., access point 104A) and received by client device 106 that is reported by client device 106. Memory 110 may be configured to store a second set of information indicative of a second set of physical layer rates associated with a second set of power levels (e.g., table 202). In table 202, the second set of physical layer rates may be physical layer rates between client device 106 and the second access point (e.g., access point 104B), and the second set of power levels may be information indicative of an amount of power in a signal transmitted by the second access point (e.g., access point 104B) and received by client device 106 that is reported by client device 106.

In one or more examples, one or more processors 108 may utilize tables 200 and 202 to determine whether to switch a communications session for client device 106. For example, during a communication session between client device 106 and a first access point (e.g., access point 104A) of the two or more access points 104, one or more processors 108 may determine a current power level between client device 106 and a second access point (e.g., access point 104B) of the two or more access points 104 that is reported by client device 106. For instance, as described above, an 802.11k report may indicate the power level, as reported by client device 106, of the signals that client device 106 receives from respective access points 104. Client device 106 may probe each of the access points 104 to determine the power level of signals that client device 106 receives from each of access points 104 to generate the report.

As an example, to determine the current power level, one or more processors 108 may be configured to transmit a request to client device 106 for generating a report in accordance with the Institute of Electrical and Electronics Engineers (IEEE) 802.11k standard. One or more processors 108 may receive, from client device 106, the report, and may determine the current power level between client device 106 and the second access point (e.g., access point 104B) during the communication session between client device 106 and the first access point (e.g., access point 104A) based on the received report.

One or more processors 108 may access the stored information based on the current power level between client device 106 and the second access point (e.g., access point 104B) to determine an expected physical layer rate between client device 106 and the second access point (e.g., access point 104B). For example, assume that one or more processors determined that current power level between client device 106 and access point 104B is 150. In this example, based on table 202, one or more processors 108 may determine that the expected physical layer rate between client device 106 and access point 104B is 150 Mbps.

For instance, assume that table 202 is a second set of information stored in memory 110. In this example, one or more processors 108 may access the second set of information based on the current power level between client device 106 and the second access point (e.g., access point 104B) to determine a physical layer rate associated with the current power level, which in FIG. 2 is 150 Mbps since 150 Mbps is associated with power level of 150. In this example, the determined physical layer rate (e.g., 150 Mbps) is the expected physical layer rate.

In one or more examples, one or more processors 108 may also use the determined additional contexts or factors as inputs into table 202. For instance, in some cases, the physical layer rate may not be based only on the power level. Rather, the physical layer rate stored in table 202 may be based on the power level, and the example additional contexts and factors. One or more processors 108 may access the stored information based on the current power level between client device 106 and the second access point (e.g., access point 104B), as well as the example contexts and factors, to determine an expected physical layer rate between client device 106 and the second access point (e.g., access point 104B).

One or more processors 108 may determine a current physical layer rate between client device 106 and the first access point (e.g., access point 104A). As an example, one or more processors 108 may request for the current physical layer rate from access point 104A since access point 104A is communicating with client device 106.

In one or more examples, one or more processors 108 may determine whether to switch the communication session from between client device 106 and the first access point (e.g., access point 104A) to client device 106 and the second access point (e.g., access point 104B) based on the expected physical layer rate and the current physical layer rate. As an example, one or more processors 108 may determine a current end-to-end physical layer rate based on the current physical layer rate and physical layer rates between one or more intermediate access points and WAN 102, and determine an expected end-to-end physical layer rate based on the expected physical layer rate and physical layer rates between one or more intermediate access points and WAN 102. One or more processors 108 may compare the current end-to-end physical layer rate and the expected end-to-end physical layer rate, and determine to switch the communication session based on the current end-to-end physical layer rate being less than the expected end-to-end physical layer rate.

One or more processors 108 may cause client device 106 to switch communication session based on the determination of whether to switch. For example, one or more processors 108 may end the communication session between client device 106 and access point 104A, and start a communication session between client device 106 and access point 104B.

Figure 3:
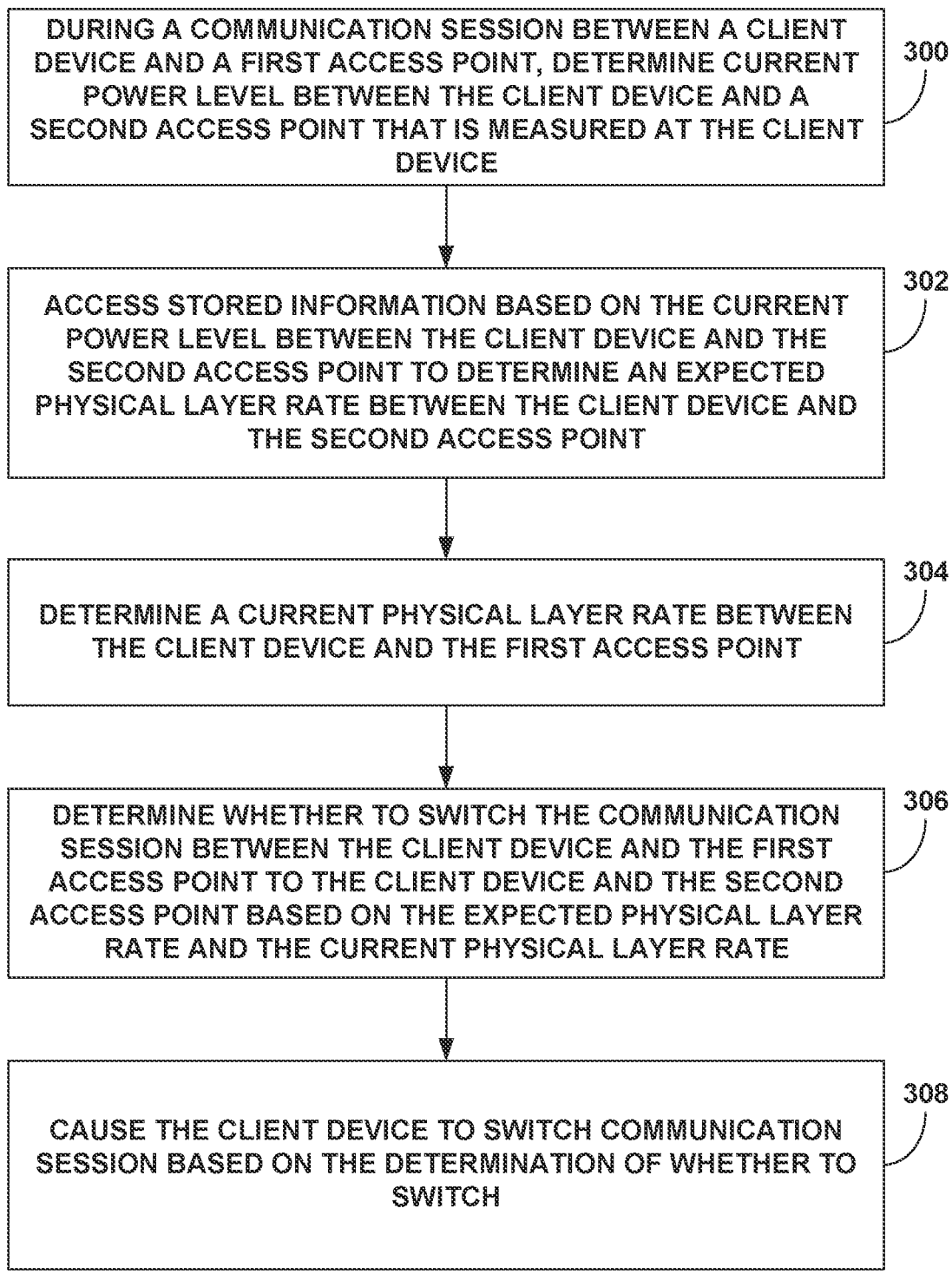
FIG. 3 is a flowchart illustrating example techniques, in accordance with one or more aspects of this disclosure.

FIG. 3 is a flowchart illustrating example techniques, in accordance with one or more aspects of this disclosure. In one or more examples, during a communication session between client device 106 and a first access point (e.g., access point 104A) of the two or more access points 104, one or more processors 108 may determine a current power level between client device 106 and a second access point (e.g., access point 104B) of the two or more access points 104 that is reported by client device 106 (300). For example, to determine the current power level, one or more processors 108 may be configured to transmit a request to the client device for generating a report in accordance with the Institute of Electrical and Electronics Engineers (IEEE) 802.11k standard, receive, from client device 106, the report, and determine the current power level between client device 106 and the second access point (e.g., access point 104B) during the communication session between client device 106 and the first access point (e.g., access point 104) based on the received report.

One or more processors 108 may access stored information from memory 110 based on the current power level between client device 106 and the second access point (e.g., access point 104B) to determine an expected physical layer rate between client device 104 and the second access point (e.g., access point 104B) (302). For instance, memory 110 may store information indicative of physical layer rates associated with power levels between the client device 106 and respective access points 104 of two or more access points 104. The respective physical layer rates may be physical layer rates between client device 106 and the respective access points 104, and the power levels may be information indicative of amounts of power in signals received by client device 106 from the respective access points 104 as reported by the client device 106.

However, in some examples, the amounts of power in signals received by client device 106 from the respective access points 104 as reported by client device 106 may be inaccurate measures of the amounts of power in the signals received by client device 106. Accordingly, to utilize the reported power levels, one or more processors 108 may have generated the information that is stored in memory 110 during an initial time period that associates power levels and physical layer rates. Therefore, even if the power levels are inaccurate, one or more processors 108 may have already stored information of what the physical layer rates were when the power levels were measured. Since the error in the power level reporting may be consistent, at a subsequent time, for a reported power level, even if inaccurate, one or more processors 108 may be able to determine the associated physical layer rate.

One or more processors 108 may determine a current physical layer rate between client device 106 and the first access point (e.g., access point 104A) (304). For instance, one or more processors 108 may receive the current physical layer rate between client device 106 and access point 104A from access point 104A.

One or more processors 108 may determine whether to switch the communication session from between client device 106 and the first access point (e.g., access point 104A) to client device 106 and the second access point (e.g., access point 104B) based on the expected physical layer rate and the current physical layer rate (306). One or more processors 108 may cause client device 106 to switch communication session based on the determination of whether to switch.

The following describes example techniques in accordance with one or more examples described in this disclosure. The example techniques may be utilized together or separately.

Example 1. A wireless communication system comprising: memory configured to store information indicative of physical layer rates associated with power levels between a client device and respective access points of two or more access points, wherein the respective physical layer rates comprise physical layer rates between the client device and the respective access points, and wherein the power levels comprise information indicative of amounts of power in signals received by the client device from the respective access points as reported by the client device; and one or more processors, implemented in circuitry and coupled to the memory, wherein the one or more processors are configured to: during a communication session between the client device and a first access point of the two or more access points, determine a current power level between the client device and a second access point of the two or more access points that is reported by the client device; access the stored information based on the current power level between the client device and the second access point to determine an expected physical layer rate between the client device and the second access point; determine a current physical layer rate between the client device and the first access point; determine whether to switch the communication session from between the client device and the first access point to the client device and the second access point based on the expected physical layer rate and the current physical layer rate; and cause the client device to switch communication session based on the determination of whether to switch.

Example 2. The system of example 1, wherein to store the information, the memory is configured to: store a first set of information indicative of a first set of physical layer rates associated with a first set of power levels, wherein the first set of physical layer rates comprise physical layer rates between the client device and the first access point, and wherein the first set of power levels comprise information indicative of an amount of power in a signal transmitted by the first access point and received by the client device that is reported by the client device; and store a second set of information indicative of a second set of physical layer rates associated with a second set of power levels, wherein the second set of physical layer rates comprise physical layer rates between the client device and the second access point, and wherein the second set of power levels comprise information indicative of an amount of power in a signal transmitted by the second access point and received by the client device that is reported by the client device, and wherein to access the stored information, the one or more processors are configured to: access the second set of information based on the current power level between the client device and the second access point to determine a physical layer rate associated with the current power level, wherein the determined physical layer rate comprises the expected physical layer rate.

Example 3. The system of any of examples 1 and 2, wherein to determine the current power level, the one or more processors are configured to: transmit a request to the client device for generating a report in accordance with the Institute of Electrical and Electronics Engineers (IEEE) 802.11k standard; receive, from the client device, the report; and determine the current power level between the client device and the second access point during the communication session between the client device and the first access point based on the received report.

Example 4. The system of any of examples 1-3, wherein the one or more processors are configured to generate the information indicative of physical layer rates associated with power levels between the client device and the respective access points of the two or more access points during an initial time period.

Example 5. The system of example 4, wherein the one or more processors are configured to: interpolate or extrapolate predicted physical layer rates associated with predicted power levels between the client device and the respective access points based on the stored information; and store the predicted physical layer rates associated with the predicted power levels as additional information indicative of the physical layer rates associated with the power levels between the client device and the respective access points.

Example 6. The system of any of examples 4 and 5, wherein to generate the information indicative of physical layer rates associated with power levels between the client device and the respective access points, the one or more processors are configured to: determine a plurality of physical layer rates associated with one power level between the client device and the respective access points; determine statistics of the plurality of physical layer rates; determine one physical layer rate based on the statistics; and associate the determined physical layer rate with the one power level.

Example 7. The system of any of examples claim 4-6, wherein to generate the information indicative of physical layer rates associated with power levels between the client device and the respective access points, the one or more processors are configured to: determine whether one or more of the physical layer rates associated with the power levels are invalid based on the physical layer rates not monotonically increasing or decreasing relative to the power levels; and remove the one or more physical layer rates associated with the power level from the information indicative of physical layer rates associated with power levels.

Example 8. The system of example 7, wherein to determine whether the one or more of the physical layer rates associated with the power levels is invalid based on the physical layer rates not monotonically increasing or decreasing relative to the power levels, the one or more processors are configured to determine that the physical layer rates have not plateaued relative to the power levels.

Example 9. The system of any of examples 1-8, wherein the information indicative of the physical layer rates associated with respective power levels comprises respective mathematical functions that define a relationship between the physical layer rates associated with respective power levels.

Example 10. The system of any of examples 1-9, wherein the information indicative of the physical layer rates associated with respective power levels comprises respective tables that include information of physical layer rates and associated power levels.

Example 11. The system of any of examples 1-10, wherein to determine whether to switch the communication session, the one or more processors are configured to: determine a current end-to-end physical layer rate based on the current physical layer rate and physical layer rates between one or more intermediate access points and a wide area network (WAN); determine an expected end-to-end physical layer rate based on the expected physical layer rate and physical layer rates between one or more intermediate access points and the WAN; compare the current end-to-end physical layer rate and the expected end-to-end physical layer rate; and determine to switch the communication session based on the current end-to-end physical layer rate being less than the expected end-to-end physical layer rate.

Example 12. The system of any of examples 1-11, wherein the expected physical layer rate is a first expected physical layer rate, the one or more processors are configured to: determine a second expected physical layer rate based on respective power levels between the client device and the respective access points that are reported by the respective access points; and determine whether to utilize the first expected physical layer rate or the second expected physical layer rate, wherein to determine whether to switch the communication session, the one or more processors are configured to determine whether to switch the communication session based on the first expected physical layer rate in response to the determination to utilize the first expected physical layer rate.

Example 13. The system of any of examples 1-12, wherein at least one of: one of the one or more access points includes the one or more processors; a cloud computing environment includes the one or more processors; or a router in an enterprise includes the one or more processors.

Example 14. The system of any of examples 1-13, wherein the amounts of power in signals received by the client device from the respective access points as reported by the client device are inaccurate measures of the amounts of power in the signals received by the client device.

Example 15. The system of any of examples 1-14, wherein the one or more processors are configured to determine the current power level between the client device and the second access point and one or more of band information, standard information, downstream spatial stream information, downstream modulation coding scheme information, and channel bandwidth information of the second access point, wherein to access the stored information, the one or more processors are configured to access the stored information based on the current power level between the client device and the second access point and one or more of the band information, standard information, downstream spatial stream information, downstream modulation coding scheme information, and channel bandwidth information to determine the expected physical layer rate between the client device and the second access point.

Example 16. A method for switching communication session, the method comprising: during a communication session between a client device and a first access point of two or more access points, determining, with one or more processors, a current power level between the client device and a second access point of the two or more access points that is reported by the client device; accessing, with the one or more processors, stored information based on the current power level between the client device and the second access point to determine an expected physical layer rate between the client device and the second access point, wherein the stored information is indicative of physical layer rates associated with power levels between the client device and respective access points of the two or more access points, wherein the respective physical layer rates comprise physical layer rates between the client device and the respective access points, and wherein the power levels comprise information indicative of amounts of power in signals received by the client device from the respective access points as reported by the client device; determining, with the one or more processors, a current physical layer rate between the client device and the first access point; determining, with the one or more processors, whether to switch the communication session from between the client device and the first access point to the client device and the second access point based on the expected physical layer rate and the current physical layer rate; and causing, with the one or more processors, the client device to switch communication session based on the determination of whether to switch.

Example 17. The method of example 16, wherein the information comprises: a first set of information indicative of a first set of physical layer rates associated with a first set of power levels, wherein the first set of physical layer rates comprise physical layer rates between the client device and the first access point, and wherein the first set of power levels comprise information indicative of an amount of power in a signal transmitted by the first access point and received by the client device that is reported by the client device; and a second set of information indicative of a second set of physical layer rates associated with a second set of power levels, wherein the second set of physical layer rates comprise physical layer rates between the client device and the second access point, and wherein the second set of power levels comprise information indicative of an amount of power in a signal transmitted by the second access point and received by the client device that is reported by the client device, and wherein accessing the stored information comprises accessing the second set of information based on the current power level between the client device and the second access point to determine a physical layer rate associated with the current power level, wherein the determined physical layer rate comprises the expected physical layer rate.

Example 18. The method of any of examples 16 and 17, wherein determining the current power level comprising: transmitting a request to the client device for generating a report in accordance with the Institute of Electrical and Electronics Engineers (IEEE) 802.11k standard; receiving, from the client device, the report; and determining the current power level between the client device and the second access point during the communication session between the client device and the first access point based on the received report.

Example 19. The method of any of examples 16-18, wherein the information indicative of the physical layer rates associated with respective power levels comprises respective mathematical functions that define a relationship between the physical layer rates associated with respective power levels.

Example 20. The method of any of examples 16-19, wherein the information indicative of the physical layer rates associated with respective power levels comprises respective tables that include information of physical layer rates and associated power levels.

Example 21. The method of any of examples 16-20, wherein determining whether to switch the communication session comprises: determining a current end-to-end physical layer rate based on the current physical layer rate and physical layer rates between one or more intermediate access points and a wide area network (WAN); determining an expected end-to-end physical layer rate based on the expected physical layer rate and physical layer rates between one or more intermediate access points and the WAN; comparing the current end-to-end physical layer rate and the expected end-to-end physical layer rate; and determining to switch the communication session based on the current end-to-end physical layer rate being less than the expected end-to-end physical layer rate.

Example 22. The method of any of examples 16-21, wherein the expected physical layer rate is a first expected physical layer rate, the method further comprising: determining a second expected physical layer rate based on respective power levels between the client device and the respective access points that are reported by the respective access points; and determining whether to utilize the first expected physical layer rate or the second expected physical layer rate, wherein determining whether to switch the communication session comprises determining whether to switch the communication session based on the first expected physical layer rate in response to the determination to utilize the first expected physical layer rate.

Example 23. A computer-readable storage medium storing instructions thereon that when executed cause one or more processors to: during a communication session between a client device and a first access point of two or more access points, determine a current power level between the client device and a second access point of the two or more access points that is reported by the client device; access stored information based on the current power level between the client device and the second access point to determine an expected physical layer rate between the client device and the second access point, wherein the stored information is indicative of physical layer rates associated with power levels between the client device and respective access points of the two or more access points, wherein the respective physical layer rates comprise physical layer rates between the client device and the respective access points, and wherein the power levels comprise information indicative of amounts of power in signals received by the client device from the respective access points as reported by the client device; determine a current physical layer rate between the client device and the first access point; determine whether to switch the communication session from between the client device and the first access point to the client device and the second access point based on the expected physical layer rate and the current physical layer rate; and cause the client device to switch communication session based on the determination of whether to switch.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to nontransient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor" or "controller" as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an IC or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A wireless communication system comprising:
   memory configured to store information indicative of physical layer rates associated with power levels between a client device and respective access points of two or more access points, wherein the respective physical layer rates comprise physical layer rates between the client device and the respective access points, and wherein the power levels comprise information indicative of amounts of power in signals received by the client device from the respective access points as reported by the client device; and
   one or more processors, implemented in circuitry and coupled to the memory, wherein the one or more processors are configured to:
      during a communication session between the client device and a first access point of the two or more access points, determine a current power level between the client device and a second access point of the two or more access points that is reported by the client device;
      access the stored information based on the current power level between the client device and the second access point to determine an expected physical layer rate between the client device and the second access point;
      determine a current physical layer rate between the client device and the first access point;
      determine whether to switch the communication session from between the client device and the first access point to the client device and the second access point based on the expected physical layer rate and the current physical layer rate,
      wherein to determine whether to switch the communication session, the one or more processors are configured to:
         determine a current end-to-end physical layer rate based on the current physical layer rate and physical layer rates between one or more intermediate access points and a wide area network (WAN);
         determine an expected end-to-end physical layer rate based on the expected physical layer rate and physical layer rates between one or more intermediate access points and the WAN;
         compare the current end-to-end physical layer rate and the expected end-to-end physical layer rate; and
         determine to switch the communication session based on the current end-to-end physical layer rate being less than the expected end-to-end physical layer rate; and
      cause the client device to switch communication session based on the determination to switch.

2. The system of claim 1,
   wherein to store the information, the memory is configured to:
      store a first set of information indicative of a first set of physical layer rates associated with a first set of power levels, wherein the first set of physical layer rates comprise physical layer rates between the client device and the first access point, and wherein the first set of power levels comprise information indicative of an amount of power in a signal transmitted by the first access point and received by the client device that is reported by the client device; and
      store a second set of information indicative of a second set of physical layer rates associated with a second set of power levels, wherein the second set of physical layer rates comprise physical layer rates between the client device and the second access point, and wherein the second set of power levels comprise information indicative of an amount of power in a signal transmitted by the second access point and received by the client device that is reported by the client device, and
   wherein to access the stored information, the one or more processors are configured to:
      access the second set of information based on the current power level between the client device and the second access point to determine a physical layer rate associated with the current power level, wherein the determined physical layer rate comprises the expected physical layer rate.

3. The system of claim 1, wherein to determine the current power level, the one or more processors are configured to:
   transmit a request to the client device for generating a report in accordance with the Institute of Electrical and Electronics Engineers (IEEE) 802.11k standard;
   receive, from the client device, the report; and
   determine the current power level between the client device and the second access point during the communication session between the client device and the first access point based on the received report.

4. The system of claim 1, wherein the one or more processors are configured to generate the information indicative of physical layer rates associated with power levels between the client device and the respective access points of the two or more access points during an initial time period.

5. The system of claim 4, wherein the one or more processors are configured to:
   interpolate or extrapolate predicted physical layer rates associated with predicted power levels between the client device and the respective access points based on the stored information; and store the predicted physical layer rates associated with the predicted power levels as additional information indicative of the physical layer rates associated with the power levels between the client device and the respective access points.

6. The system of claim 4, wherein to generate the information indicative of physical layer rates associated with power levels between the client device and the respective access points, the one or more processors are configured to:
determine a plurality of physical layer rates associated with one power level between the client device and the respective access points;
determine statistics of the plurality of physical layer rates;
determine one physical layer rate based on the statistics; and
associate the determined physical layer rate with the one power level.

7. The system of claim 4, wherein to generate the information indicative of physical layer rates associated with power levels between the client device and the respective access points, the one or more processors are configured to:
determine whether one or more of the physical layer rates associated with the power levels are invalid based on the physical layer rates not monotonically increasing or decreasing relative to the power levels; and
remove the one or more physical layer rates associated with the power level from the information indicative of physical layer rates associated with power levels.

8. The system of claim 7, wherein to determine whether the one or more of the physical layer rates associated with the power levels is invalid based on the physical layer rates not monotonically increasing or decreasing relative to the power levels, the one or more processors are configured to determine that the physical layer rates have not plateaued relative to the power levels.

9. The system of claim 1, wherein the information indicative of the physical layer rates associated with respective power levels comprises respective mathematical functions that define a relationship between the physical layer rates associated with respective power levels.

10. The system of claim 1, wherein the information indicative of the physical layer rates associated with respective power levels comprises respective tables that include information of physical layer rates and associated power levels.

11. The system of claim 1, wherein the expected physical layer rate is a first expected physical layer rate, the one or more processors are configured to:
determine a second expected physical layer rate based on respective power levels between the client device and the respective access points that are reported by the respective access points; and
determine whether to utilize the first expected physical layer rate or the second expected physical layer rate,
wherein to determine whether to switch the communication session, the one or more processors are configured to determine whether to switch the communication session based on the first expected physical layer rate in response to the determination to utilize the first expected physical layer rate.

12. The system of claim 1, wherein at least one of:
one of the one or more access points includes the one or more processors;
a cloud computing environment includes the one or more processors; or
a router in an enterprise includes the one or more processors.

13. The system of claim 1, wherein the amounts of power in signals received by the client device from the respective access points as reported by the client device are inaccurate measures of the amounts of power in the signals received by the client device.

14. The system of claim 1, wherein the one or more processors are configured to determine the current power level between the client device and the second access point and one or more of band information, standard information, downstream spatial stream information, downstream modulation coding scheme information, and channel bandwidth information of the second access point,
wherein to access the stored information, the one or more processors are configured to access the stored information based on the current power level between the client device and the second access point and one or more of the band information, standard information, downstream spatial stream information, downstream modulation coding scheme information, and channel bandwidth information to determine the expected physical layer rate between the client device and the second access point.

15. A method for switching communication session, the method comprising:
during a communication session between a client device and a first access point of two or more access points, determining, with one or more processors, a current power level between the client device and a second access point of the two or more access points that is reported by the client device;
accessing, with the one or more processors, stored information based on the current power level between the client device and the second access point to determine an expected physical layer rate between the client device and the second access point, wherein the stored information is indicative of physical layer rates associated with power levels between the client device and respective access points of the two or more access points, wherein the respective physical layer rates comprise physical layer rates between the client device and the respective access points, and wherein the power levels comprise information indicative of amounts of power in signals received by the client device from the respective access points as reported by the client device;
determining, with the one or more processors, a current physical layer rate between the client device and the first access point;
determining, with the one or more processors, whether to switch the communication session from between the client device and the first access point to the client device and the second access point based on the expected physical layer rate and the current physical layer rate,
wherein determining whether to switch the communication session comprises:
determining a current end-to-end physical layer rate based on the current physical layer rate and physical layer rates between one or more intermediate access points and a wide area network (WAN);
determining an expected end-to-end physical layer rate based on the expected physical layer rate and physical layer rates between one or more intermediate access points and the WAN;
comparing the current end-to-end physical layer rate and the expected end-to-end physical layer rate; and determining to switch the communication session based on the current end-to-end physical layer rate being less than the expected end-to-end physical layer rate; and causing, with the one or more processors, the client device to switch communication session based on the determination to switch.

16. The method of claim 15, wherein the information comprises:

a first set of information indicative of a first set of physical layer rates associated with a first set of power levels, wherein the first set of physical layer rates comprise physical layer rates between the client device and the first access point, and wherein the first set of power levels comprise information indicative of an amount of power in a signal transmitted by the first access point and received by the client device that is reported by the client device; and a second set of information indicative of a second set of physical layer rates associated with a second set of power levels, wherein the second set of physical layer rates comprise physical layer rates between the client device and the second access point, and wherein the second set of power levels comprise information indicative of an amount of power in a signal transmitted by the second access point and received by the client device that is reported by the client device, and wherein accessing the stored information comprises accessing the second set of information based on the current power level between the client device and the second access point to determine a physical layer rate associated with the current power level, wherein the determined physical layer rate comprises the expected physical layer rate.

17. The method of claim 15, wherein determining the current power level comprising:

transmitting a request to the client device for generating a report in accordance with the Institute of Electrical and Electronics Engineers (IEEE) 802.11k standard;

receiving, from the client device, the report; and determining the current power level between the client device and the second access point during the communication session between the client device and the first access point based on the received report.

18. The method of claim 15, wherein the information indicative of the physical layer rates associated with respective power levels comprises respective mathematical functions that define a relationship between the physical layer rates associated with respective power levels.

19. The method of claim 15, wherein the information indicative of the physical layer rates associated with respective power levels comprises respective tables that include information of physical layer rates and associated power levels.

20. The method of claim 15, wherein the expected physical layer rate is a first expected physical layer rate, the method further comprising:

determining a second expected physical layer rate based on respective power levels between the client device and the respective access points that are reported by the respective access points; and determining whether to utilize the first expected physical layer rate or the second expected physical layer rate, wherein determining whether to switch the communication session comprises determining whether to switch the communication session based on the first expected physical layer rate in response to the determination to utilize the first expected physical layer rate.

21. A computer-readable storage medium storing instructions thereon that when executed cause one or more processors to:

during a communication session between a client device and a first access point of two or more access points, determine a current power level between the client device and a second access point of the two or more access points that is reported by the client device;

access stored information based on the current power level between the client device and the second access point to determine an expected physical layer rate between the client device and the second access point, wherein the stored information is indicative of physical layer rates associated with power levels between the client device and respective access points of the two or more access points, wherein the respective physical layer rates comprise physical layer rates between the client device and the respective access points, and wherein the power levels comprise information indicative of amounts of power in signals received by the client device from the respective access points as reported by the client device;

determine a current physical layer rate between the client device and the first access point;

determine whether to switch the communication session from between the client device and the first access point to the client device and the second access point based on the expected physical layer rate and the current physical layer rate, wherein the instructions that cause the one or more processors to determine whether to switch the communication session comprise instructions that cause the one or more processors to:

determine a current end-to-end physical layer rate based on the current physical layer rate and physical layer rates between one or more intermediate access points and a wide area network (WAN);

determine an expected end-to-end physical layer rate based on the expected physical layer rate and physical layer rates between one or more intermediate access points and the WAN;

compare the current end-to-end physical layer rate and the expected end-to-end physical layer rate; and determine to switch the communication session based on the current end-to-end physical layer rate being less than the expected end-to-end physical layer rate; and cause the client device to switch communication session based on the determination to switch.

* * * * *